United States Patent Office 2,724,006
Patented Nov. 15, 1955

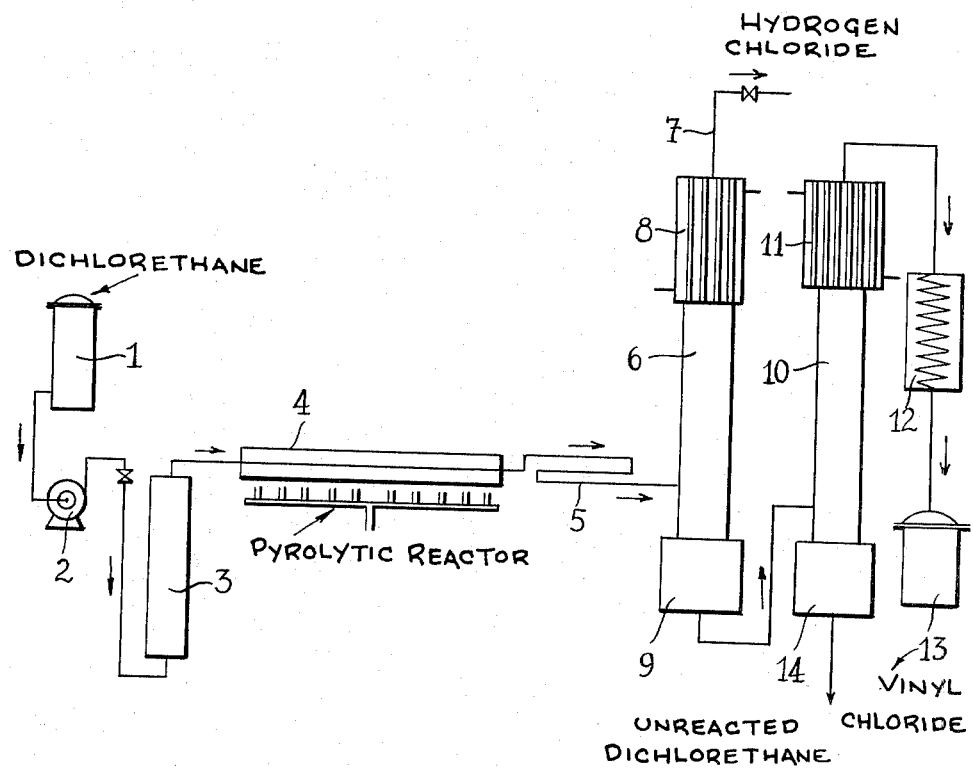

2,724,006

PROCESS OF PREPARING VINYL CHLORIDE

Hans Krekeler, Konigstein, Germany, assignor to Farbwerke Hoechst Aktiengesellschaft vormals Meister Lucius & Bruning, Frankfurt am Main-Hochst, Germany, a company of Germany Application June 9, 1954, Serial No. 435,549

Claims priority, application Germany December 27, 1950

6 Claims. (Cl. 260—656)

The present invention relates to a process of preparing vinyl chloride.

This application is a continuation in part of application Serial No. 263,367 filed December 26, 1951, now abandoned.

It is known that vinyl chloride can be obtained from dichlorethane in the form of vapor by splitting off hydrogen chloride at a temperature of about 600° C. in the absence of a catalyst. The reaction is conducted under atmospheric pressure. The working up of the resulting reaction gases, namely, vinyl chloride, hydrogen chloride and unreacted dichlorethane entails considerable technical difficulty and is rather expensive. To separate the vinyl chloride from the hydrogen chloride formed it is necessary to use either very low temperatures or large quantities of a solvent. Even the separation of the hydrogen chloride by means of water or hydrochloric acid of 20 per cent strength gives rise to corrosion difficulties.

Furthermore it is known that in the production of vinyl chloride by a pyrolysis of dichlorethane a serious difficulty raises from the deposition of solid or high boiling by-products which coke-up the tubes and limit the process to the utilization of only relatively short operating periods. The deposits formed are generally of such a nature that they require opening of the tubes and their removal therefrom by mechanical means. Execution of the reaction in unpacked reaction tubes often occasions the entrainment of high boiling reaction products from the reaction zone to an extent resulting in the fouling and clogging of parts of the apparatus such as heat exchangers, pumps, fractionators, and the like, through which the reaction products are passed. A still further difficulty often inherent in the use of unpacked tubular reactors is the inability to readily maintain a desired reaction temperature therein.

It has also been proposed in U. S. specification 2,569,923 to fill the reaction tube with a non-catalytic non-porous packing material by which procedure the formation of by-products and the deposition of carbonaceous material in the reaction zone is reduced and the plugging of the reactor is retarded. In column 5/6, lines 45 to 64, of the specification cited the author himself describes that in the absence of the packing material the reactor is plugged after a reaction time of 51 to 61 hours, and that in the presence of the packing material an adjustment has to be made after 107 to 114 hours. This reaction was carried out at a pressure of 100 lbs. per square inch which is equivalent to 7 atmospheres absolute.

Now, I have found that vinyl chloride can be made from dichlorethane without clogging of reaction tubes and with special advantage by heating the parent substance at a high temperature under superatmospheric pressure.

It has been found that there is obtained a certain reduction of clogging when working at about 15 atmospheres (gauge) and that the reduction of the formation of carbonaceous deposits is almost complete at 20 atmospheres. For this reason the process of this invention is advantageously carried out between about 20 to about 35 atmospheres (gauge), though higher pressures may be employed within the scope of this invention. This process is preferably carried out in unpacked tubes, because an unpacked reaction tube can be cleaned much better if any undesired interruption of the reaction occurs, which generally is accompanied by the formation of deposits and clogging of packed tubes. In packed tubes these deposits can only be removed by burning them out at high temperatures.

The process of this invention can be carried out in any suitable apparatus. Advantageously, the process is conducted continuously in tubes in the absence of a catalyst. The pressure is preferably chosen so that the reaction mixture can be liquefied by cooling to a temperature which is not very low. Generally, the pressure need not exceed 15 atmospheres (gauge). For instance, the splitting can be brought about with good extents of conversion at 20 atmospheres (gauge). Care must be taken to use tubes of small diameter in order to avoid too long a period of exposure to the temperature used for splitting. In general this period ranges from fractions of a second to several seconds. It is not necessary to use for the splitting a temperature more than 20° C. higher than that usually applied for splitting under atmospheric pressure. Advantageously, temperatures ranging from about 450° C. to about 650° C. are used.

It has been found that when the splitting is carried out under superatmospheric pressure within the range of pressure cited above there is less cracking of chlorohydrocarbons into smaller cleavage products and carbon than when working under atmospheric pressure. It seems to be noteworthy that under these conditions the formation of carbon is nearly completely prevented and consequently there is no contamination of parts of the different apparatus, e. g. of heat exchangers, pumps etc. This is so because the reaction heat is distributed far better in a gas mixture of a high density than in one of a low density. Consequently less carbon is produced at high pressures than at lower pressures. Furthermore the application of high pressure provides an important technical advantage, because it allows a better separation of the hydrogen chloride by fractional distillation, which otherwise can only be done after cooling down the gas mixture to a low temperature. For instance, when working according to the reference cited at a pressure of 7 atmospheres absolute, the boiling temperature of hydrogen chloride is —40° C., while —17° C., at 15 atmospheres (gauge), —8° C. at 20 atmospheres (gauge) and 0° C. at 25 atmospheres (gauge).

In thermal splitting under superatmospheric pressure, the yield per unit of space and time is very high. For example, about 120 to about 150 kilograms of dichlorethane per hour per litre of reaction space can be converted into vinylchloride. In order to avoid undesirable side reactions, it is of advantage to convert the dichlorethane only to the extent of about 40 to about 70 per cent. However, it is also possible to carry the reaction further without formation of considerable quantities of by-products. By maintaining a high velocity of flow in the tubes, advantageously having a small diameter, clogging of the tubes due to the deposition of soot, which is in any case small, can be substantially avoided. Of course this high velocity of flow can better be attained in unpacked reaction tubes than in reaction tubes containing filling material. Furthermore it is well possible to maintain a desired reaction temperature when working under superatmospheric pressure because of the increased density of the reaction mixture. Owing to the good heat transfer produced by turbulent flow, the temperature of the walls of the reaction tubes can be kept relatively low. The use of superatmospheric pressure also increases the heat transfer in the tubes.

The reaction mixture may be worked up in various ways. It is especially advantageous to subject the reaction mixture to a fractional distillation under superatmospheric pressure. Pressures ranging from 5 atmospheres (gauge) to about 35 atmospheres (gauge) may be used. The distillation may be carried out periodically in one or several columns or the separation of the reaction mixture may be carried out continuously. For example, the procedure may be as follows: The reaction gases leaving the reaction tubes are freed from the carbon formed by means of a cyclone separator, and cooled in an air cooler to about 50° C. to about 150° C. The mixture thus cooled, which consists of hydrogen chloride, vinyl chloride, dichlorethane and small quantities of inert gases, is subjected to fractional distillation under superatmospheric pressure, advantageously the same pressure as that used for the splitting or a lower pressure. The hydrogen chloride separates first, and liquid hydrogen chloride is caused to reflux by suitably cooling in a dephlegmator. The hydrogen chloride is free from organic constituents and of excellent purity. Since the amount of the inert gases obtained in the present process is very small, the loss of hydrogen chloride can be kept very low. After condensation of the hydrogen chloride, the uncondensed gases can be removed by releasing the pressure. The material, which consists mainly of vinyl chloride and unreacted dichlorethane, remaining in the sump of the first column is fractionated in a second column operated under a correspondingly lower pressure. The unreacted dichlorethane contains very little residual material and, after redistillation, can be returned to the process. The vinyl chloride formed is advantageously washed with an alkaline solution, after which it is extremely pure and suitable for polymerisation without any further treatment.

The figure shows a schematic representation in elevation.

The process may be carried out, for example, in the apparatus shown diagrammatically in the accompanying drawing. Dichlorethane (the 1:2-product as well as the 1:1-product) is passed from a container 1 to a pump 2 which produces a pressure of about 25 atmospheres (gauge) in the succeeding portion of the apparatus. The dichlorethane then passes into an evaporator 3, in which it is evaporated, and is introduced at about 300° C. into a reaction furnace 4. In the reaction tube of the furnace 4 the temperature is, for example, about 500° C. The mixture of gases formed during the reaction is first cooled in a cooler 5 to about 50° C., and then introduced into a column 6. In the column 6 the pressure is also about 25 atmospheres (gauge). In this column, hydrogen chloride is driven off and leaves the apparatus through a tube 7 and is released from pressure. A dephlegmator 8 of the column 6 is supplied with a cooling brine at about −10° C. In a sump 9, which is at a temperature of about 170° C., a mixture collects which consists mainly of vinyl chloride and unreacted dichlorethane. This mixture is led from the sump to a column 10 in which the vinyl chloride is distilled off and passes through a dephlegmator 11 supplied with a cooling liquid at about 20° C. and through a further cooler 12 into the receiver 13. The column 10 is maintained at a pressure of about 8 atmospheres (gauge). In the sump 14 of this column a residue collects which consists mainly of unreacted dichlorethane which can be returned to the process.

It is also of advantage in the present process to release the reaction gases from pressure, after completion of the reaction under pressure, and either to subject the gases to distillation at low temperatures, or first to remove the hydrogen chloride by means of an absorbent and then separate the vinyl chloride by distillation from the unreacted dichlorethane. In the former case, the hydrogen chloride distills first at a temperature of about −80° C. or higher, and then the vinyl chloride is distilled at a temperature above about −14° C. In the second case, the absorption is advantageously carried out by means of water or an aqueous solution of hydrogen chloride of 20 per cent strength, and the vinyl chloride is then distilled off as above described.

The following examples serve to illustrate the invention but they are not intended to limit it thereto:

Example 1

Through a tube of stainless steel having a length of 3 m. and an internal diameter of 6 mm. 1.2.-dichlorethane is passed at the rate of 20 kilograms per hour under a pressure of 25 atmospheres (gauge) and at a temperature of 480° C.–490° C. (taken in the tube). The reaction products consist of about 10 kgs. of unaltered non-reacted dichlorethane, 6 kgs. of vinyl chlorides, 3.6 kgs. of hydrogen chloride and 200 liters of gas resulting from cracking. The yield of vinyl chloride, calculated on the reacted dichlorethane, thus amounts to 95 per cent.

Example 2

Under a pressure of 25 atmospheres (gauge) and at a temperature of 580° C. (taken outside) 6 kilograms of 1.2-dichlorethane vapor are passed through a tube of refined steel having a length of 1 metre and an internal diameter of 6 mm. The reaction product is cooled in a trickling cooler to 50° C. The gases, which are now partially condensed, are subjected to fractional distillation in a distillation column under the same pressure. In the column liquid hydrogen chloride is refluxed by means of a dephlegmator. At the upper end of the column, 1.05 kilograms of hydrogen chloride are released from tension at about 0° C. After absorption of the hydrogen chloride by means of water, there remains only about 1 litre of gases resulting from cracking.

The residue from the column, heated at about 170° C., is passed to a second column, which operates under a pressure of about 8 atmospheres (gauge). In this column unreacted dichlorethane is separated from the vinyl chloride formed. 1.72 kilograms of vinyl chloride and 3.1 kilograms of dichlorethane are obtained, which latter can be distilled off and used again.

The extent of conversion in one passage thus amounts to 49 per cent and the yield of vinyl chloride to 95 per cent.

Example 3

6000 grams of 1.2-dichlorethane vapor are passed per hour through a tube of refined steel having a length of 1 m. and an internal diameter of 6 mm. The reaction temperature is about 600° C. The pressure is maintained at 20 atmospheres (gauge) during the reaction. The reaction gases leaving the furnace are cooled to 70° C., and released to atmospheric pressure. By subsequent distillation at −85° C. and atmospheric pressure 1090 grams of hydrogen chloride, 1820 grams of vinyl chloride and 3050 grams of unreacted dichlorethane are obtained per hour. Only about 4 litres of gas resulting from the splitting are produced per hour. The extent of conversion amounts to 49 per cent and the yield of vinyl chloride to 98 per cent. The unreacted dichlorethane can be reused in the reaction.

I claim:

1. In the process of preparing vinyl chloride by thermal decomposition of dichlorethane the step which comprises carrying out the thermal decomposition with application of a pressure between at least 20 and at most 35 atmospheres (gauge) in unpacked tubes.

2. In the process of preparing vinyl chloride by thermal decomposition of dichlorethane the step which comprises carrying out the thermal decomposition with application of a pressure between at least 20 atmospheres (gauge) and at most 35 atmospheres (gauge) at temperatures between about 450° C. and about 650° C. in unpacked tubes.

3. In the process of preparing vinyl chloride by thermal decomposition of dichlorethane the steps which comprise carrying out the thermal decomposition with application of a pressure between at least 20 atmospheres (gauge) and at most 35 atmospheres (gauge) and subjecting the products thus obtained to a fractional distillation at a pressure between about 5 atmospheres (gauge) and at most 35 atmospheres (gauge) to obtain vinyl chloride.

4. In the process of preparing vinyl chloride by thermal decomposition of dichlorethane the steps which comprise carrying out the thermal decomposition with application of a pressure between at least 20 atmospheres (gauge) and at most 35 atmospheres (gauge) at temperatures between about 450° C. and about 650° C. and subjecting the products thus obtained to a fractional distillation at a pressure between at least 20 atmospheres (gauge) and at most 35 atmospheres (gauge) to obtain vinyl chloride.

5. In the process of preparing vinyl chloride by thermal decomposition of 1.2-dichlorethane the steps which comprise carrying out the thermal decomposition with application of a pressure between at least 20 atmospheres (gauge) and at most 35 atmospheres (gauge) at temperatures between about 450° C. and about 650° C. and subjecting the products thus obtained to a fractional distillation at a pressure between at least 20 atmospheres (gauge) and at most 35 atmospheres (gauge) to obtain vinyl chloride.

6. In the process of preparing vinyl chloride by thermal decomposition of 1.1-dichlorethane the steps which comprise carrying out the thermal decomposition with application of a pressure between at least 20 atmospheres (gauge) and at most 35 atmospheres (gauge) at temperatures between about 450° C. and about 650° C. and subjecting the products thus obtained to a fractional distillation at a pressure between at least 20 atmospheres (gauge) and at most 35 atmospheres (gauge) to obtain vinyl chloride.

References Cited in the file of this patent
UNITED STATES PATENTS
2,569,923   Cheney _____ Oct. 2, 1951